June 4, 1963    R. F. NELSON    3,092,213
RAILWAY TRUCK BRAKE BEAM BOTTOM ROD SAFETY DEVICE
Filed May 31, 1960

Inventor
Reuben F. Nelson
By Rodney Bedell
atty.

United States Patent Office 3,092,213
Patented June 4, 1963

3,092,213
RAILWAY TRUCK BRAKE BEAM BOTTOM ROD SAFETY DEVICE
Reuben F. Nelson, Roseville, Calif., assignor, by mesne assignments, to American Seal-Kap Corporation of Delaware, New York, N.Y., a corporation of Delaware
Filed May 31, 1960, Ser. No. 32,973
4 Claims. (Cl. 188—210)

The invention relates to brake gear for railway trucks and consists in a bottom rod guard retainer and brake beam shield assembly applicable to a brake beam main member.

The main object of the invention is to prevent wear of a brake beam main member, such as a channel section, by pounding or shifting of the guard on the member. It is important to maintain the cross sectional area of a beam main member throughout its length. It is not desirable and generally it is not permitted to rivet support or guard members to the beam member. The usual frictional engagement between the guard and the beam is insufficient to prevent relative movement and wear between them tending to produce grooves or notches in the beam member so deep that the strength of the beam is affected.

In the accompanying drawings illustrating selected embodiments of the invention:

Figure 1:
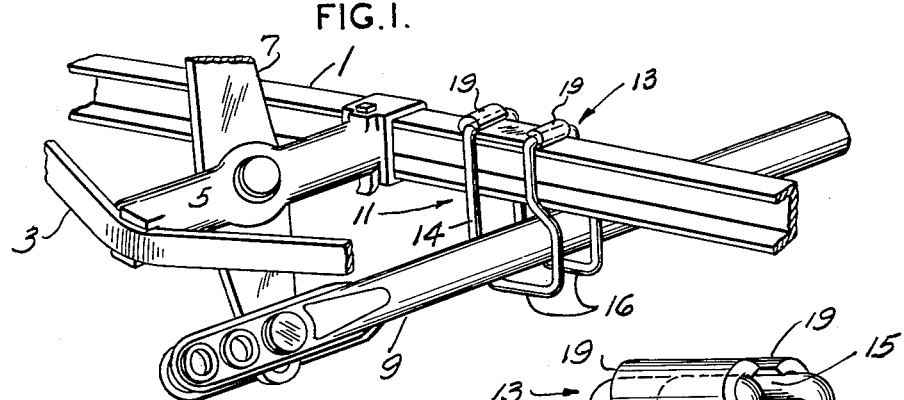
FIGURE 1 is a perspective of the central portion of a truss type brake beam showing its operating lever and a bottom connecting rod leading to an adjacent brake beam, a safety guard for the bottom connection and the shield and retaining device supporting the guard on the brake beam compression member.
Figure 3:
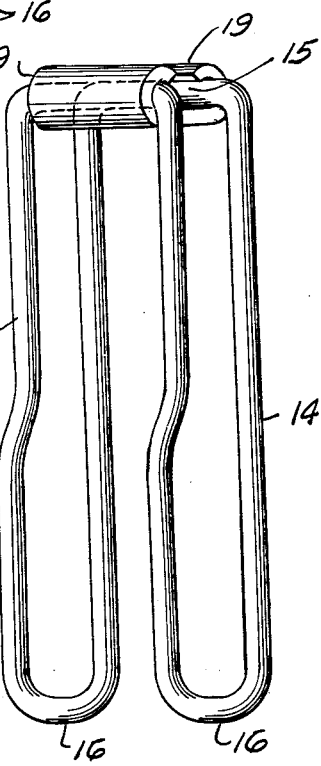
FIGURE 3 is a side elevation of the assembly shown in FIGURE 2.
Figure 2:
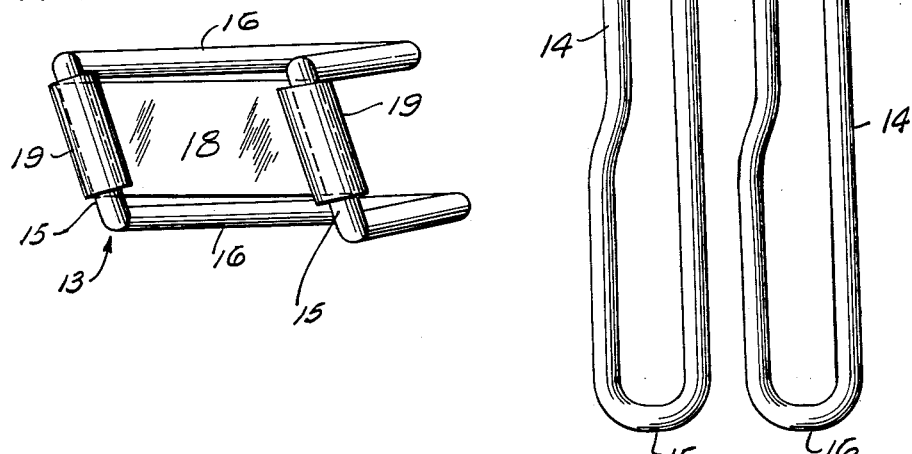
FIGURE 2 is a top view of the guard shield-retainer assembly before being applied to the beam compression member.

Referring to FIGURE 1, the brake beam compression member 1 of channel section, the brake beam tension member 3 comprising a flat bar, the strut 5, the lever 7 and the bottom connecting rod 9 are all well-known construction. A guard 11 is applied to compression member 1 and includes a pair of inverted loops 13 each having upright legs 14 and a cross bar 15, the lower ends of the two loops being connected by transverse sections 16. The guard is formed of a single continuous rod and is given an initial twist or set of the loops relative to each other, as shown in FIGURES 2 and 3 in which the guard cross bars 15 normally are inclined to the upright planes of the loops 13 as defined by their respective legs 14 and cross bars 15 and the perpendicular distance between the loops 13 is less than the width of the compression member channel 1 to which the guard is to be applied so that the distance between the loops 13 is increased when the guard is forced over the beam channel and the cross bars are distorted to extend at right angles to the channel and thereby increase their effective length across the channel, as shown in FIGURE 1. This causes the guard to more tightly grip the channel. Also this construction adapts the guard for tight frictional application to the channel irrespective of minor differences in the width of the channel flange due to rolling tolerances.

Notwithstanding the frictional gripping of the brake beam channel by the guard, the continual shifting, pounding and sliding of the guard on the beam channel due to track irregularities, truck spring action, application and release of the brakes, etc. tend to cause the guard to wear grooves and notches in the channel, which reduces its cross sectional area at restricted points. To better resist this undesirable result, a shield and guard stiffening and retainer device is applied to the cross bars 15 of the guard, the device comprising a substantially rectangular, horizontally disposed body 18 with upstanding flanges 19 at opposite ends, bent over the guard cross bars 15. The upstanding flanges 19 may be C-shaped to frictionally grip the guard cross bars 15 or their edges may be hammered over the cross bars. The device tends to increase the resistance of the cross bars 15 to distortion from their original relation to the upright planes of the loops 13 and also provides a flat bearing surface of substantial area in contact with the channel top flange as distinguished from the restricted bearing surface contact of the guard cross bars as previously used. Upon original installation of the guard without device 18, 19, there is only line contact between the guard and the beam and it is only after the bar wears into the channel flange that a gradually increasing contact area develops which nevertheless remains rather narrow. When such wear occurs in the edge of the channel flange, the width of the channel flange between legs 14 would be reduced and the frictional grip depending upon the resilience of the guard legs 14 would decrease. The inclusion of shield 18, 19 avoids such undesirable wear because of the flat wide bearing of the shield on the channel and the large area arcuate bearings of the shield on cross bars 15.

Figure 4:
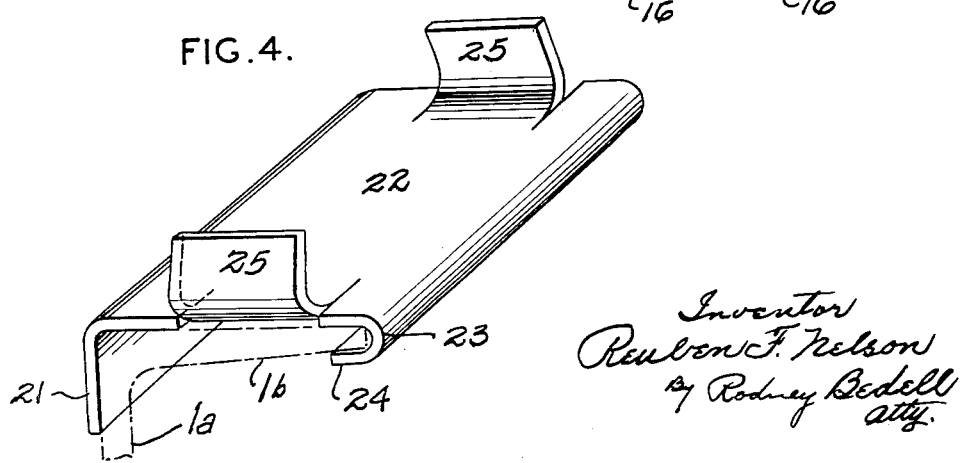
FIGURE 4 is a perspective illustrating another form of shield for assembly with the guard and compression member.

FIGURE 4 illustrates another form of the shield-retainer device which has increased area of contact for the opposing surfaces of the beam and the guard. In this form a depending flange 21 along one edge of the flat body 22 is adapted to engage the upright web 1a of the channel compression member 1. A depending flange 23 along the other edge of the body may be bent inwardly at 24 to underlie the upper flange 1b of the channel compression member. The frictional contact of flange 23 with the underside of the channel flange further resists shifting of the shield-retainer along the channel. However, if there is relative shifting, the frictional contact will be distributed over such a wide area that wear reduction of the cross sectional area of the channel will be negligible. The inturned flange 24 will resist upward movement of the guard relative to the channel, irrespective of the effectiveness of the frictional gripping. It will be understood that the device itself may be produced as a separate unit and applied to guards already in service. Whether the device is part of the original equipment, or added later, it protects the narrow edges of the channel flanges against notching by the guard upright legs, as there will be no direct contact between the guard and the channel. End ears 25 will secure the guard, not shown, in place.

The details of the brake beam main member, bottom rod guard and shield-retainer device may be varied otherwise without departing from the spirit of the invention and the exclusive use of those modifications coming within the scope of the claims is contemplated.

I claim:
1. A safety device for a railway brake beam bottom connection rod, comprising a substantially flat body adapted to overlie and extend along an upwardly facing flat portion of a brake beam main member of angular cross section substantially throughout the width of said flat portion, inverted loops of rod material overlying, straddling and depending below said body, each loop including spaced upright legs and a cross bar engaging said body and inclined lengthwise of said body, said cross bars spacing the loops a predetermined distance apart, said cross bars being distortible lengthwise of said body to increase the distance between the legs of each loop to yieldingly accommodate a beam member between the legs, and upturned elements on the ends of said body constructed and arranged to embrace said spaced apart cross bars and to resist their distortion, there being an element depending from a side of the substantially flat body and having an inturned lip at its lower margin spaced from said body to underlie a part of a horizontal flange of the beam member and prevent upward movement of the safety device relative to the beam member.

2. A railway brake beam bottom rod guard safety device comprising a rectangular flat body applicable directly to the flat top face of an upper horizontal flange of a brake beam main member of channel cross section, there being upturned elements at oposite edges of said body constructed and arranged to embrace spaced apart cross members of downwardly opening loops of a bottom rod guard carried on the device, there being a depending element along one of the remaining edges of said body constructed and arranged to engage the upright web of the brake beam main member, and there being a downwardly and inwardly bent element along the other edge of said body adapted to engage the outer edge and lower face of the beam main member flange to which the device is applied.

3. A safety device for a railway brake beam bottom connection rod, comprising a substantially flat body adapted to overlie and extend along an upwardly facing flat portion of a brake beam main member of angular cross section substantially throughout the width of said flat portion, inverted loops of rod material overlying, straddling and depending below said body, each loop including spaced upright legs and a cross bar engaging said body, said cross bars spacing the loops a predetermined distance apart, and upturned elements on the ends of said body constructed and arranged to embrace said spaced apart cross bars, there being an element depending from a side of the substantially flat body and having an inturned lip at its lower margin spaced from said body to underlie a part of a horizontal flange of the brake beam main member and prevent upward movement of the safety device relative to the brake beam main member.

4. In combination, a railway truss type brake beam having a compression member with a flat top face of substantial width, a bottom rod guard including spaced horizontal cross bars above the compression member, there being integral legs depending from the cross bars at each side of the beam member and merging at their lower ends to form vertically elongated upwardly open loops at the sides of the compression member, a brake beam bottom connecting rod loosely received and freely reciprocable lengthwise within said loops, and a plate bearing element mounted on said compression member face and supporting said cross bars, said plate bearing element having upturned end flanges rebent over said cross bars so that the end flanges frictionally grip said cross bars and increase their resistance to distortion, said guard being distorted transversely of the beam member by application thereto to hold the beam member, guard, and wear plate tightly assembled independently of the bottom connecting rod.

References Cited in the file of this patent
UNITED STATES PATENTS

| | | |
|---|---|---|
| 789,894 | Williams | May 16, 1905 |
| 1,735,055 | Priebe | Nov. 12, 1929 |
| 1,867,000 | Crone | July 17, 1932 |
| 2,042,740 | Smith | June 2, 1936 |
| 2,788,869 | Spaeth et al. | Apr. 16, 1957 |
| 2,795,300 | Soddy | June 11, 1957 |